US 6,644,069 B2

(12) United States Patent
Kohmura et al.

(10) Patent No.: US 6,644,069 B2
(45) Date of Patent: Nov. 11, 2003

(54) METHOD OF HEATING AND PROCESSING AN END OF AN OPTICAL FIBER PREFORM AND APPARATUS FOR HEATING AND PROCESSING AN END OF AN OPTICAL FIBER PREFORM

(75) Inventors: Yukio Kohmura, Aichi (JP); Masahide Kuwabara, Mie (JP); Kiyoshi Arima, Mie (JP); Yasuhiro Naka, Mie (JP); Shinpei Todo, Mie (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 131 days.

(21) Appl. No.: 09/782,152

(22) Filed: Feb. 14, 2001

(65) Prior Publication Data

US 2001/0023598 A1 Sep. 27, 2001

Related U.S. Application Data

(63) Continuation of application No. PCT/JP00/03861, filed on Jun. 14, 2000.

(30) Foreign Application Priority Data

Jun. 14, 1999 (JP) ............................................. 11-166477

(51) Int. Cl.[7] ............................................. C03D 21/00
(52) U.S. Cl. .............................. 65/433; 65/384; 65/435; 65/488; 65/510; 65/513; 65/533
(58) Field of Search ........................ 65/377, 384, 433, 65/435, 483, 488, 510, 533, 513

(56) References Cited

U.S. PATENT DOCUMENTS 4,737,004 A * 4/1988 Amitay et al. ........... 350/96.15

FOREIGN PATENT DOCUMENTS

| JP | 4-154642 | * 5/1992 |
| JP | 4-193731 | 7/1992 |
| JP | 8-310825 | 11/1996 |
| JP | 11-79772 | 3/1999 |

OTHER PUBLICATIONS

Abstract of JP404154642A, May 1992.*

* cited by examiner

*Primary Examiner*—James Derrington
(74) *Attorney, Agent, or Firm*—Oblon, Spivak, McClelland, Maier & Neustadt, P.C.

(57) ABSTRACT

An end heating and processing method of an optical fiber preform. In this method, an optical fiber preform is processed by heating and melting an end of a vitrified optical fiber preform including a core portion and a cladding portion formed on an outer circumference thereof to process the end having a shape for drawing as an optical fiber.

8 Claims, 13 Drawing Sheets

P2 > P1

P2 = P1

P2 < P1

LIST OF REFERENCES 1. heating furnace 2. upper heating furnace (second heating means)

3. lower heating furnace (first heating means)

4. furnace body 5. core portion 6. cladding portion 7. optical fiber preform 7a. support rod 8. gas nozzle 9. lower chamber 10. shutter 11. cooling portion 12. suspension mechanism 15. controlling means 20, 20A. end heating and processing apparatus 21. heating and processing furnace 23. cutter 25. cut portion removal chamber 26. vacuum gate valve 27. shutter 28. purge gas feed port 29. purge gas discharge port 35. controlling means

METHOD OF HEATING AND PROCESSING AN END OF AN OPTICAL FIBER PREFORM AND APPARATUS FOR HEATING AND PROCESSING AN END OF AN OPTICAL FIBER PREFORM

This is a Continuation of international PCT/JP00/03861, filed Jun. 14, 2000.

TECHNICAL FIELD

The present invention relates to a method of heating and processing an optical fiber preform which is performed before drawing a vitrified optical fiber preform to form an optical fiber comprising a core portion and a cladding portion covering an outer circumference of the core portion, and to an apparatus used for the same.

More specifically, the present invention relates to a method of heating and processing an end of an optical fiber preform which processes into a predetermined shape an end of an optical fiber preform used for drawing an optical fiber, and to an apparatus for heating and processing an end of an optical fiber preform used for the same.

BACKGROUND ART

Optical fibers are being widely used for many applications such as optical communication and optical measurement.

For example, a single mode silica-glass optical fiber has a core having a diameter of 10 $\mu$m, a cladding having a diameter of 125 $\mu$m formed on the outer circumference of this core, and a resin covering coated on the outer circumference of this cladding. A dopant for raising a refractive index is introduced in the core, whereby the refractive index of the core is made higher than a refractive index of the cladding.

Such an optical fiber is formed by heating and drawing an optical fiber preform. An optical fiber preform has a core portion corresponding to the core of the optical fiber and a cladding portion corresponding to the cladding of the optical fiber.

When heating and drawing a transparent vitrified optical fiber preform comprising a core portion and a cladding portion covering the outer circumference thereof to produce for example an optical fiber having a core and a cladding described above, the heating is started from the cladding portion located at the outer circumference of the core portion. In an initial stage of the heating, however, usually the core portion does not extend up to the tip of the optical fiber preform. If the core portion inside the optical fiber preform is not exposed from the tip of the optical fiber preform and does not exhibit the shape of the melted and deformed portion at the time of drawing, even if the preform is drawn, a normal optical fiber comprising a core and cladding will not be immediately formed. For this reason, when heating and drawing an optical fiber preform, it is necessary to change the shape of the end of the optical fiber preform to the shape of the melted and deformed portion at the time of drawing in advance. If heating and drawing an optical fiber preform with an end shaped to that of the melted and deformed portion at the time drawing in this way, a normal single mode optical fiber having for example a core with a diameter of 10 $\mu$m and a cladding with a diameter of 125 $\mu$m formed on the outer circumference of this core can be formed without wasted drawing.

In this way, when drawing an optical fiber preform, as a pretreatment, treatment to process the end of the optical fiber preform to a preferred shape for drawing, for example, the shape of the melted and deformed portion at the time of drawing, becomes necessary.

In this specification, this work will be referred to as an end heating and processing method of the optical fiber preform, and the apparatus used for this treatment will be referred to as an end heating and processing apparatus of an optical fiber preform.

How quickly and efficiently the core portion is made to be exposed from the tip of the optical fiber preform is a key point for improvement of the operating rate of a heating furnace and other equipments.

If heating and processing the end of an optical fiber preform at a high speed, however, since a viscosity of the core portion containing the dopant for raising the refractive index and the viscosity of the cladding portion are different, the drawing is not carried out in accordance with the ratio of the outer diameters of the core portion and the cladding portion and therefore the diameter of the optical fiber can be varied. If the variation of the diameter of the optical fiber becomes large, the thickness of the coating when coating an ultraviolet curing resin or the like on the outer circumference of the drawn optical fiber (outer circumference of the cladding) will become uneven and the coating will become defective leading to breakage of the optical fiber.

In order to prevent such the disadvantage, heretofore a method of machining the tip of the optical fiber preform by a glass lathe to expose the core portion from the end of the optical fiber has been attempted. In this method, however, scraps produced when machining the surface of the optical fiber preform will sometimes deposit at the end of the optical fiber preform. The deposited scraps or the like adversely influence the drawing of the optical fiber preform and sometimes cause also defects in the outer diameter of the drawn optical fiber.

On the other hand, the optical fiber preform as a whole is held at or heated to a temperature of 1200 to 1300° C. in the heating furnace after the transparent vitrification and then taken out of the heating furnace into the ambient atmosphere of an ordinary temperature for producing the drawn optical fiber or for storage before drawing. If the optical fiber preform is taken out of the heating furnace into the atmosphere and the surface of the optical fiber preform is rapidly cooled, however, minute strain sometimes remains at the surface of the optical fiber preform. This residual strain tends to lower the strength of the optical fiber after drawing.

DISCLOSURE OF THE INVENTION

An object of the present invention is to provide an end heating and processing method of an optical fiber preform capable of eliminating minute strain remaining in the optical fiber preform and shortening a startup time of a drawing process of an optical fiber.

Another object of the present invention is to provide an end heating and processing apparatus of an optical fiber preform used for the end heating and processing method of an optical fiber preform.

The end heating and processing method of the optical fiber preform of the present invention includes a step of processing an optical fiber preform by heating and melting an end of a vitrified optical fiber preform comprising a core portion and a cladding portion formed on an outer circumference thereof to process the end having a shape for drawing as an optical fiber.

Preferably, the optical fiber preform processing step has an optical fiber preform positioning step of positioning the end of the optical fiber preform in the vicinity of a heating portion for heating the end of the optical fiber preform, an end processing step of heating the end of the optical fiber preform to process the related end to the shape of a melted and deformed portion at the time of the drawing, and an unnecessary portion elimination step of eliminating an unnecessary portion of the end processed portion obtained by heating and melting the optical fiber preform processed to the predetermined shape.

More preferably, the method further includes, after the unnecessary portion elimination step, an optical fiber preform end cooling step of blowing an inert gas to the end of the optical fiber preform remaining after the elimination of the unnecessary portion to cool the same.

More preferably, in the end processing step, the end of the optical fiber preform is processed so that a length from a parallel portion to the end of the optical fiber preform becomes a length, to whereby approach a startup time of the drawing process of the optical fiber the shortest time.

More preferably, the method further includes, after the optical fiber preform processing step, a temperature lowering step for lowering the heating temperature of the optical fiber preform to a temperature whereby thermal strain does not occur in the optical fiber preform even in an air atmosphere.

More preferably, in the temperature lowering step, the optical fiber preform as a whole is heated to 1100 to 1300° C., then the heating temperature of the optical fiber preform is lowered to 600 to 400° C.

More preferably, in the end processing step, an inert gas sealing gas is made to flow from above to below at the periphery of the end heating portion of the optical fiber preform.

More preferably, before the introduction of the optical fiber preform into a heating region before the end processing step, an inert sealing gas is made to flow from above to below to the end heating portion of the optical fiber preform.

More preferably, in the unnecessary portion elimination step in the optical fiber preform processing step, the heating region is shut off from the outside air, and the unnecessary portion is discharged from the heating region to the outside in a state maintaining the heated state.

More preferably, in the unnecessary portion elimination step in the optical fiber preform processing step, the unnecessary portion is eliminated while leaving an amount corresponding to the optical fiber preform drawn from the start of the drawing of the optical fiber to when a target drawing speed is reached.

An end heating and processing apparatus of an optical fiber preform of the present invention is an end heating and processing apparatus of an optical fiber preform comprising a heating furnace for heating and processing an end of a vitrified optical fiber preform comprising a core portion and a cladding portion covering the outer circumference thereof and a controlling means for controlling the heating and processing, wherein the heating furnace comprises a suspending means located above the related heating furnace, introducing the optical fiber preform into the related heating furnace, and positioning it in elevation position, a first heating means for heating a lower end of the optical fiber preform introduced in the heating furnace, and an unnecessary portion discharging means for discharging the unnecessary portion in the processed portion of the lower end of the optical fiber preform to the outside and wherein the controlling means controls the first heating means to process the end of the optical fiber preform to the shape of a melted and deformed portion at the time of drawing.

Preferably, the apparatus further comprises an unnecessary portion cut away means located below the first heating means and cutting away an unnecessary portion in the processed portion of the lower end of the optical fiber preform.

More preferably, the apparatus further comprises an unnecessary portion holder located below the unnecessary portion cut away means for holding the cut away unnecessary portion.

More preferably, the unnecessary portion holder is provided with a cooling means for cooling the interior of the related unnecessary portion holder.

More preferably, the apparatus further comprises a second heating means located above the first heating means for heating the portion above the lower end of the optical fiber preform introduced in the heating furnace.

More preferably, the apparatus further comprises a coolant discharging means located below the first heating means for blowing a coolant to the melted portion of the end of the optical fiber preform to solidify the end of the optical fiber preform.

More preferably, the controlling means controls the suspending means to position the end of the optical fiber preform at the first heating means for heating and melting the end of the optical fiber preform, controls the temperature of the first heating means to heat and melt the end of the optical fiber preform and process the related end to the shape of the melted and deformed portion at the time of drawing, and controls the unnecessary portion discharging means to discharge the unnecessary portion of the end of the optical fiber preform to the outside.

More preferably, the controlling means controls the unnecessary portion cut away means to cut away the unnecessary portion, has the unnecessary portion held in the unnecessary portion holder, and, when the unnecessary portion is cooled to a predetermined temperature or less, drives the unnecessary portion discharging means to discharge the unnecessary portion to the outside.

More preferably, the controlling means repeats the positioning of the optical fiber preform and the heating and processing until the tip of the core portion of the optical fiber preform exhibits the shape of the melted and deformed portion at the time of drawing.

More preferably, the controlling means performs the step of changing the length from the parallel portion to the end of the optical fiber preform to a length, to whereby approach the startup time of the drawing step of the optical fiber the shortest time.

More preferably, the controlling means controls the drive of the second heating means and the first heating means after the optical fiber preform end processing step to lower the heating temperature of the optical fiber preform to a temperature where thermal strain does not occur in the optical fiber preform even in an air atmosphere.

More preferably, the controlling means controls the drive of the second heating means and the first heating means in the temperature lowering treatment stage so that the optical fiber preform as a whole is heated to 1100 to 1300° C. and then the heating temperature of the optical fiber preform is lowered to 600 to 400° C.

More preferably, the apparatus further comprises a first sealing gas feeding means for making an inert sealing gas flow from above to below in an internal portion of the first heating means at the time of the end processing of the optical fiber preform.

More preferably, the apparatus further comprises a second sealing gas feeding means for making an inert sealing gas flow from below to above in an internal portion of the first heating means before the introduction of the optical fiber preform into the heating region before the end processing of the optical fiber preform.

More preferably, the apparatus further comprises a partitioning means between the first heating means and a means for discharging the cut away unnecessary portion to the outside for partitioning the space between them in an openable/closable manner and a gas purging means for purging the internal portion of the unnecessary portion holding chamber by an inert gas, and the unnecessary portion holding chamber is located between the partitioning means and the outside.

More preferably, when discharging the unnecessary portion to the outside, the controlling means closes the partitioning means to isolate the first heating means from the outside air, opens the unnecessary portion discharging means to discharge the unnecessary portion held in the unnecessary portion holding chamber to the outside, closes the discharging means to isolate the unnecessary portion holding chamber from the outside air, drives the gas purging means to discharge the outside air from the unnecessary portion holding chamber, and opens the partition portion to connect the first heating means and the unnecessary portion holding chamber.

More preferably, the first heating means is a carbon resistance furnace.

BEST MODE FOR CARRYING OUT THE INVENTION

First Embodiment

Figure 1:
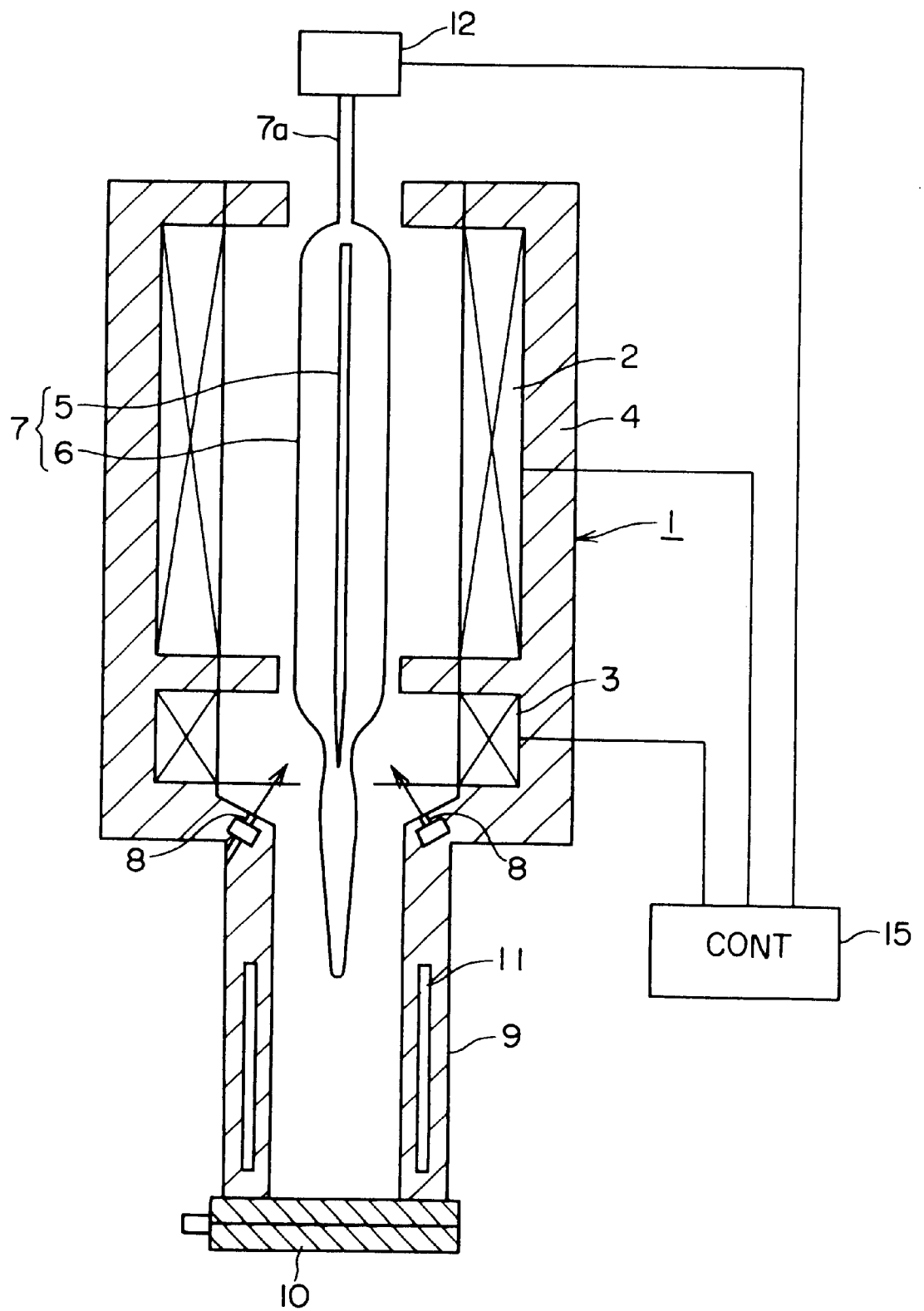
FIG. 1 is a longitudinal sectional view of a heating furnace according to a first embodiment of a heating and processing apparatus of an end of an optical fiber preform of the present invention.

FIG. 1 is a longitudinal sectional view illustrating a principal portion of the heating furnace according to a first embodiment of a heating and processing apparatus of an end of an optical fiber preform of the present invention.

A heating furnace 1 illustrated in FIG. 1 is provided with a furnace body 4 provided with an upper heating furnace 2 serving as a second heating means of the present invention and a lower heating furnace 3 serving as a first heating means of the present invention. In the furnace body 4, a vitrified optical fiber preform 7 is held supported by a support rod 7a. The support rod 7a is supported by a suspension mechanism 12 located above it. The support rod 7a and the suspension mechanism 12 constitute a suspending means of the present invention.

Gas nozzles 8 are provided below the lower heating furnace 3. A lower chamber 9 corresponds to an unnecessary portion holder of the present invention.

In the wall of the lower chamber 9, a cooling portion 11 for circulating a cooling medium such as cooling water therein is provided. The cooling portion 11 corresponds to a cooling means of the present invention.

The lower chamber 9 is provided below the gas nozzles 8. A plurality of gas nozzles 8 are provided below the furnace body 4 to cool the lower portion of the processed optical fiber preform 7 explained later. The gas nozzles 8 correspond to a coolant discharging means of the present invention.

A shutter 10 is provided below the lower chamber 9. The lower chamber 9 is provided continuous with the bottom of the furnace body 4 under the gas nozzles 8. The lower end of the lower chamber 9 is opened or closed by the shutter 10. The shutter 10 corresponds to a partitioning means of the present invention.

The vitrified optical fiber preform 7 has a core portion 5 and a cladding portion 6 covering the outer circumference thereof. In the drawing process of the optical fiber performed after the processing explained in the present specification, when the optical fiber preform 7 is heated and drawn, the core portion 5 becomes for example a core having a diameter of 10 μm, and the cladding portion 6 becomes a cladding having a diameter of 125 μm. Therefore, a coating of an ultraviolet curing resin or the like is applied to the drawn optical fiber.

As the heating and processing apparatus of the end of the optical fiber preform of the present invention, a controlling means 15 is provided in addition to the heating furnace 1. The controlling means 15 controls the heating of the upper heating furnace 2 and the lower heating furnace 3 as a basic control operation. Further, the controlling means 15 controls the spray of coolant from the gas nozzles 8 and controls the elevation (up/down) and rotation of the suspension mechanism 12. The controlling means 15 includes for example a built-in microcomputer. The microcomputer performs the above control processing.

The heating furnace 1 and the controlling means 15 illustrated in FIG. 1 are used as an example of the end heating and processing apparatus of the optical fiber preform of the present invention for forming the end of the optical fiber preform 7 into a predetermined shape and for preventing cooling strain as pretreatment before heating and drawing the optical fiber preform 7 to form the optical fiber.

An embodiment of the end heating and processing method of an optical fiber preform of the present invention carried out by using the heating furnace 1 and the controlling means 15 will be explained next with reference to FIG. 2.

Figure 2:
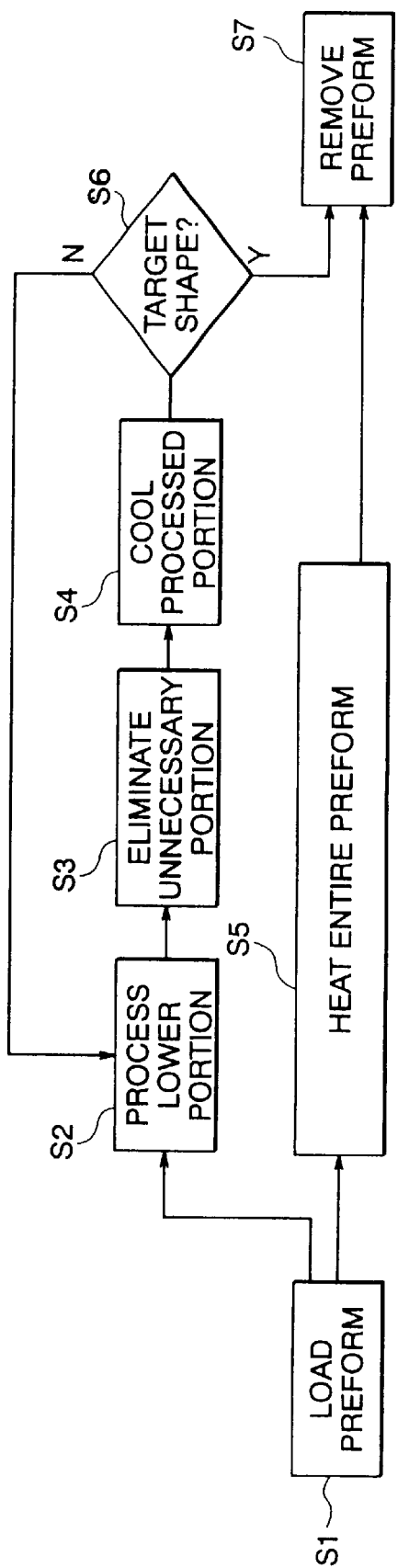
FIG. 2 is a flowchart of a heating and processing method of an end of an optical fiber preform according to a first embodiment of the present invention using a heating furnace illustrated in FIG. 1.

FIG. 2 is a flowchart illustrating steps carried out by the heating furnace 1 and the controlling means 15 illustrated in FIG. 1.

Step 1: Step of Loading Optical Fiber Preform

A vitrified optical fiber preform 7 having a core portion 5 and a cladding portion 6 is supported by the support rod 7a and made to descend into the furnace body 4 by driving the suspension mechanism 12 to load the optical fiber preform 7 in the furnace body 4 as illustrated in FIG. 1. Particularly, the optical fiber preform 7 is arranged inside the furnace body 4 so that the lower portion of the optical fiber preform 7 is positioned in the vicinity of the lower heating furnace 3. The controlling means 15 controls the drive of the suspension mechanism 12 to conduct this operation.

Step 2: Step of Processing Lower End of Optical Fiber Preform

The lower heating furnace 3 is driven by the controlling means 15 to heat the end of the optical fiber preform 7 suspended in the furnace body 4 by the lower heating furnace 3.

Note that, simultaneously with step 2 to step 4, preferably the entire optical fiber preform above the lower end of the optical fiber preform 7 is heated by the upper heater 2 explained in step 5. Step 5 will be explained later.

At step 2, the controlling means 15 controls the heating by the lower heater 3 to a temperature where the lower end of the optical fiber preform 7 changes to a heated and melted shape. The temperature is for example 1900 to 2000° C.

Preferably, during the melting of the lower portion of the optical fiber preform 7, the controlling means 15 controls the suspension mechanism 12 to the support rod 7a to raise or lower the optical fiber preform 7 so that the heated and melted portion of the lower end of the optical fiber preform 7 is positioned at an appropriate position of the lower heating furnace 3.

Step 3: Step of Eliminating Unnecessary Portion

In the optical fiber preform 7, the tip of the cladding portion 6 melts and dangles down as illustrated in FIG. 1.

The thus dangling cladding portion breaks away from the body of the optical fiber preform 7 due to its own weight and falls into the lower chamber 9.

The unnecessary portion (excess portion) falling into the lower chamber 9 is cooled to under a predetermined temperature by the cooling portion 11 formed in the wall of the chamber 9, then is discharged to the outside by opening the shutter 10 under the control of the controlling means 15.

Step 4: Step of Cooling Processed Portion

The heated and processed portion of the end of the optical fiber preform 7 from which the unnecessary portion was cut away in step 3 is cooled by blowing an inert gas such as nitrogen (N) or argon (Ar) from the gas nozzles 8 illustrated in FIG. 1 at a high speed under the control of the controlling means 15. By cooling in this way, since the viscosity of the heated and melted portion of the end the optical fiber preform 7 is small, that portion easily deforms and the shape of the lower end can then be solidified.

Step 1 to 4, and 6: Step of Repeating Processing of Lower Portion of Preform

Figure 3:
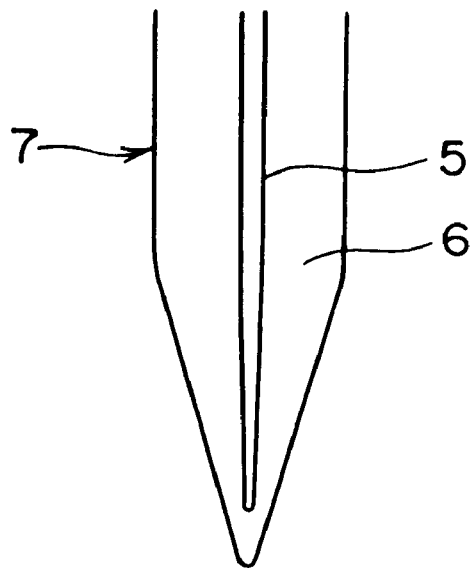
FIG. 3 is a longitudinal sectional view of a first state after melting of a lower portion of an optical fiber preform.

FIG. 3 shows the shape of the lower portion after once melting the lower portion of the optical fiber preform 7. In the shape of the end of the optical fiber preform 7 illustrated in FIG. 3, the cladding portion 6 is extended conically long, and the core portion 5 is not exposed from the end of the optical fiber preform 7. With this shape, the length of the lower end is long. This is inconvenient for conveyance of the optical fiber preform 7 for drawing or the like. Further, the core portion 5 is not exposed from the end and the shape is not the shape of the melted and deformed portion at the time of drawing. For this reason, even if drawing this to an optical fiber, a long time is taken at the time of startup until the outer diameter of the optical fiber reaches a steady state. The outer diameter of the optical fiber is not stabilized until the parallel portion of the optical fiber preform 7 is drawn. The shape of the melted and deformed portion at the time of drawing refers to for example such a shape. Such a melted portion of the cladding portion corresponds to the unnecessary portion (excess portion).

Therefore, in the present embodiment, the lower portion of the optical fiber preform 7 is melted a plurality of times under the control of the controlling means 15 until the shape of the end of the optical fiber preform becomes the shape of the melted and deformed portion at the time of drawing. Namely, the controlling means 15 repeats the above "S1: Step of Loading Optical Fiber Preform" to "S4: Step of Cooling Processed Portion" a plurality of times to process the unnecessary portion of the end of the optical fiber preform 7 having the sharp shape illustrated in FIG. 3 to a shape where the tip of the core portion 5 close to the shape of the melted and deformed portion at the time drawing as illustrated in FIG. 4.

For this, the controlling means 15 controls the suspension mechanism 12 to make the optical fiber preform 7 supported at the support rod 7a descend by a predetermined distance in the furnace body 4 corresponding to the unnecessary portion to be eliminated. At that position, the controlling means 15 controls the lower heating furnace 3 to melt the end of the optical fiber preform 7. This processing is repeated a plurality of times.

Usually, the distance over which the optical fiber preform 7 is made to descend is reduced the greater the number of times of processing. The distance can be stored in the controlling means 15 in advance. Alternatively, an imaging device for monitoring the internal portion of the lower heating furnace 3 may be provided in the heating furnace 1, a detection signal of the imaging device input to the controlling means 15, and the controlling means 15 perform image processing to confirm when the shape illustrated in FIG. 4 is exhibited and then automatically stop the movement.

Figure 4:
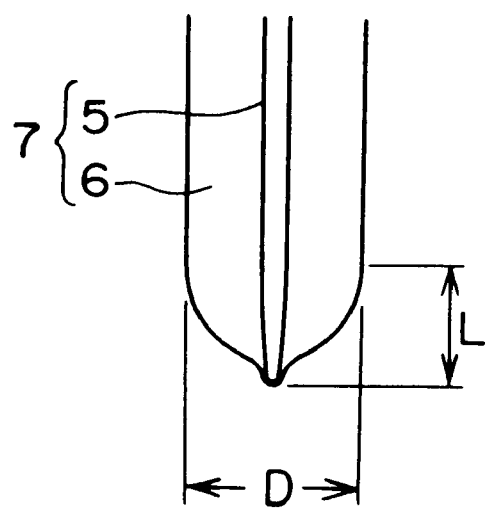
FIG. 4 is a longitudinal sectional view of a second state after melting of a lower portion of an optical fiber preform.

By performing such repeated processing, the lower tip of the optical fiber preform 7 is shortened as shown in FIG. 4. Of course, with this shape, the core portion 5 is exposed from the lower tip of the optical fiber preform 7, that is, the tip of the melted and rounded cladding portion 6, and has a shape close to the shape of the melted and deformed portion at the time of drawing. When heating, melting, and drawing the optical fiber preform 7 having the end shape illustrated in FIG. 4, a waste-free and uniform quality optical fiber comprising for example a core with a diameter of 10 $\mu$m and a cladding with a diameter of 125 $\mu$m formed on the outer circumference thereof is formed.

When using an optical fiber preform 7 having an outer diameter of 130 mm and a length of 1.5 m, it is convenient for the drawing of the optical fiber if a diameter D of the lower end of the optical fiber preform 7 illustrated in FIG. 4 is 15 to 25 mm, preferably about 20 mm, at the start of the drawing. Further, a length L from the lower end of the parallel portion of the optical fiber preform 7 to the lower end of the optical fiber preform 7 in FIG. 4 is set so that the startup time of the next drawing step approaches the shortest time. Giving a concrete example, the length L is preferably about 150 to 300 mm.

When the lower end of the optical fiber preform 7 exhibits the shape as described above, after the heating period at the startup of the drawing of the optical fiber (initial stage of drawing), for example, the intended drawing starts to be achieved at the parallel portion of the optical fiber preform 7 after about tens of minutes from the start of drawing. Namely, by using the end heating and processing method of the optical fiber preform of the present invention, the processing time of the subsequent drawing step can be shortened.

Note that, when performing the "step of repeating heating and processing of lower portion of preform" a large number of times, a long time is taken, so it is effective to obtain the shape shown in FIG. 4 by two or three steps. This is controlled by the controlling means 15. The processing time until such a shape is obtained is about 2 hours.

As the method for judging the finish of the "step of repeating heating and processing of lower portion of preform" explained above, various methods can be adopted other than the method of judgement by above number of times and the method of using an imaging device. For example, as such a method, a method of the operator examining the lower end of the optical fiber preform 7 by the naked eye and then instructing the controlling means 15 to stop the repeated processing can be adopted.

Step 5: Heating of Optical Fiber Preform as a Whole

The controlling means 15 desirably heats the entire optical fiber preform 7, above the lower end of the optical fiber preform 7, by the upper heater 2 in parallel to the operations of step 2 to step 4 and step 6. As the reason for this, the helium gas contained inside the optical fiber preform at the time of vitrification of the optical fiber preform 7 in the process before this processing is discharged from the optical fiber preform 7 during the present heating and processing by the high temperature heating of the upper portion of the optical fiber preform 7 by the upper heating furnace 2, therefore there is no longer any fluctuation in the outer diameter of the optical fiber during the drawing. Also, a reduction of the strength of the drawn optical fiber can be suppressed. Further, the discharge of the helium gas reduces a transmission loss of the drawn optical fiber.

The controlling means 15 controls the heating temperature of the lower heating furnace 3 to be higher than the heating temperature of the upper heating furnace 2. For example, the upper heating furnace 2 heats to about 1100 to 1300° C. The lower portion of the optical fiber preform 7 is melted by heating to 1900 to 2100° C. in the lower heating furnace 3.

Step 7: Step of Removal of Optical Fiber Preform

The step of removal of the optical fiber preform 7 comprises (1) a step of heating the entire optical fiber preform to a low temperature and (2) a step of taking out the optical fiber preform explained below.

(1) Step of Heating Entire Optical Fiber Preform to Low Temperature

After the end of the optical fiber preform 7 becomes a shape close to the shape of the melted and deformed portion at the time drawing illustrated in FIG. 4, before the optical fiber preform 7 is taken out of the heating furnace 1 into the atmosphere, (a) the entire optical fiber preform 7 is heated inside the heating furnace 1 and then (b) slowly cooled. Namely, the internal stress and strain of the optical fiber preform 7 after the heating of the optical fiber preform 7 are released by heating, then the temperature of the optical fiber preform 7 is reduced until the difference between the temperature of the optical fiber preform 7 and the temperature of the atmosphere becomes one of an extent where no further strain of the optical fiber preform 7 will occur due to rapid cooling. The temperature is controlled by controlling the lower heater 2 by the controlling means 15. This step is the step of heating the preform to a low temperature.

This low heating temperature is a temperature where the optical fiber preform 7 will not soften. For example, the controlling means 15 controls the upper heating furnace 2 to heat the optical fiber preform 7 at a temperature of about 1100 to 1300° C. as an initial temperature, then controls the upper heater 2 so that the temperature of the optical fiber preform 7 becomes sufficiently lower than this initial temperature, for example 600° C. or less, preferably about 600 to 400° C. If allowing the optical fiber preform 7 to naturally cool in the atmosphere from such a temperature, no stress or strain will occur in the optical fiber preform 7.

In order to shift from the heating and processing temperature atmosphere to the low temperature heating temperature, preferably first the 1900 to 2100° C. temperature of the lower heating furnace 3 for the melting of the end of the optical fiber preform 7 is lowered to the vicinity of the 1100 to 1300° C. temperature of the upper heating furnace 2 to make the internal temperature of the entire furnace body 4 comprising the upper heating furnace 2 and the lower heating furnace 3 substantially the same (1100 to 1300° C.), then the upper heating furnace 2 and the lower heating furnace 3 are controlled to be lowered to the low heating temperature (600 to 400° C.) by a constant temperature gradient. The controlling means 15 controls the temperature of the upper heating furnace 2 and the lower heating furnace 3 so as to obtain the above temperature.

Note that, in this low temperature heating step, the controlling means 15 desirably raises the entire optical fiber preform 7 a little by driving the suspension mechanism 12 so that the processing portion of the optical fiber preform 7 moves away from the lower heater 3 and is also heated by upper heater 2.

Such low temperature heating is performed for example for 2 to 3 hours.

Note that such a low temperature heating step is an additional step able to be carried out independently from the step of processing the lower portion of the optical fiber preform 7. This step can be eliminated from the end heating and processing method of the optical fiber preform of the invention of the present application too.

(2) Step of Taking Out Optical Fiber Preform

When finishing the processing of the low temperature heating step, the optical fiber preform 7 is discharged from the heating furnace 1. As the method of discharge, the optical fiber preform 7 supported by the support rod 7a is discharged from the upper portion of the heating furnace 1 under the control of the controlling means 15.

By the above, the processing of the end (lower tip) heating and processing method of the optical fiber preform of the present invention is terminated.

Among the above steps, the fundamental steps of the optical fiber preform processing process of the present invention are the step of processing the end optical fiber preform of step 2, the step of eliminating the unnecessary portion of step 3, and the step of cooling the processed portion of step 4. For the step of processing the optical fiber preform, the step of repeating step 6 may be carried out according to need. Further, desirably the step of heating the entire optical fiber preform of step 5 is carried out in parallel to the above steps.

According to the end (lower tip) heating and processing method of the optical fiber preform explained above, when drawing the optical fiber using the processed optical fiber preform 7, since the core portion is located at the center of the optical fiber preform 7 (cladding portion) from the initial stage of the drawing of the optical fiber, the optical fiber is drawn as planned and there is little breakage of even at high speed drawing. Accordingly, if using the optical fiber preform 7 according to the present invention, the drawing startup time can be shortened, and there is less breakage of the drawn optical fiber.

According to the end (lower tip) heating and processing method of the optical fiber preform of the present invention, since the shape of the lower portion of the optical fiber preform can be made constant, the conveyance and drawing conditions of the optical fiber preform 7 are stabilized.

In the end heating and processing method of the optical fiber preform of the present invention, when performing the step of heating the entire optical fiber preform shown as step 5, the heating of the entire upper portion of the optical fiber preform 7 by the upper heating furnace 2 discharges the helium gas contained inside the optical fiber preform at the time of vitrification of the optical fiber preform 7 in the process before this processing from the optical fiber preform 7 during the heating, therefore there is no longer any fluctuation in the outer diameter of the optical fiber during the drawing. Also, a reduction of the strength of the drawn optical fiber can be suppressed. Further, an increase of loss of the drawn optical fiber can be prevented by the discharge of the helium gas.

In the end (lower tip) heating and processing method of the optical fiber preform of the present invention, the processing for achieving the above effects, that is, the processing of step 1 to step 7 illustrated in FIG. 2, can be carried out consecutively by using the same heating furnace 1, therefore the work efficiency is high and the heat efficiency is good.

According to the end heating and processing method of the optical fiber preform of the present invention, since the upper heating furnace 2 for heating the entire upper portion of the optical fiber preform 7 and the lower heating furnace 3 for heating the lower end of the optical fiber preform 7 are separated and the heating temperature of the lower heating furnace 3 for heating only the lower end of the optical fiber preform 7 is made higher than the heating temperature of the upper heating furnace 2, the heating time is shortened in comparison with the case where the entire optical fiber preform 7 is heated.

The end heating and processing method of the optical fiber preform of the present invention is not limited to the above embodiment. Below, a modification thereof will be explained.

During the heating in the step of processing the lower portion of the preform and the step of repeating the processing of the lower portion of the preform, the controlling means 15 drives the suspension mechanism 12 to rotate the optical fiber preform 7 around its axial center. This facilitates uniform heating in the circumferential direction of the optical fiber preform 7 surrounded by the upper heating furnace 2 and the lower heating furnace 3 and therefore stabilizes the shape of the heated and melted portion of the lower end of the optical fiber preform 7.

More preferably, the lower heating furnace 3 is divided into a plurality of sections in the vertical direction, and the controlling means 15 controls a plurality of lower heaters so as to impart a temperature gradient in the vertical direction. By doing this, the lower portion of the optical fiber preform 7 can be further efficiently processed.

In the heating furnace 1 illustrated in FIG. 1, the description was made of the case where the upper heater 2 and the lower heater 3 were both used, but as explained above, the step of heating the entire upper portion of the optical fiber preform 7 explained as step 5 is an additional step. Therefore, when not performing step 5, it is also possible to employ a configuration without the upper heater 2 or not to control the temperature of the upper heater 2 by the controlling means 15 at step 5.

The diameter D of the lower end of the optical fiber preform 7 in FIG. 4 and the length L from the lower end of the parallel portion to the lower end of the optical fiber preform 7 are examples. If the outer diameter of the optical fiber preform 7 is different, these values are sometimes also different.

In the above illustration, the explanation was given predicated on the case of drawing the optical fiber preform 7 to a single mode optical fiber, but the optical fiber preform 7 with the shaped end according to the present invention can be applied to not only a single mode optical fiber, but also other optical fibers, for example, a polarized wave plane maintaining type optical fiber and a distributed-constant type optical fiber.

Second Embodiment

A second embodiment of an end heating and processing method of an optical fiber preform and an end (lower tip) heating and processing apparatus of the optical fiber preform of the present invention will be explained next.

As explained above, the end heating and processing method of the optical fiber preform of the first embodiment of the present invention has as one of its objects to process the optical fiber preform to an end shape of the optical fiber preform efficient for drawing to an optical fiber. The second embodiment of the present invention is a further improvement over the first embodiment.

Figure 5:
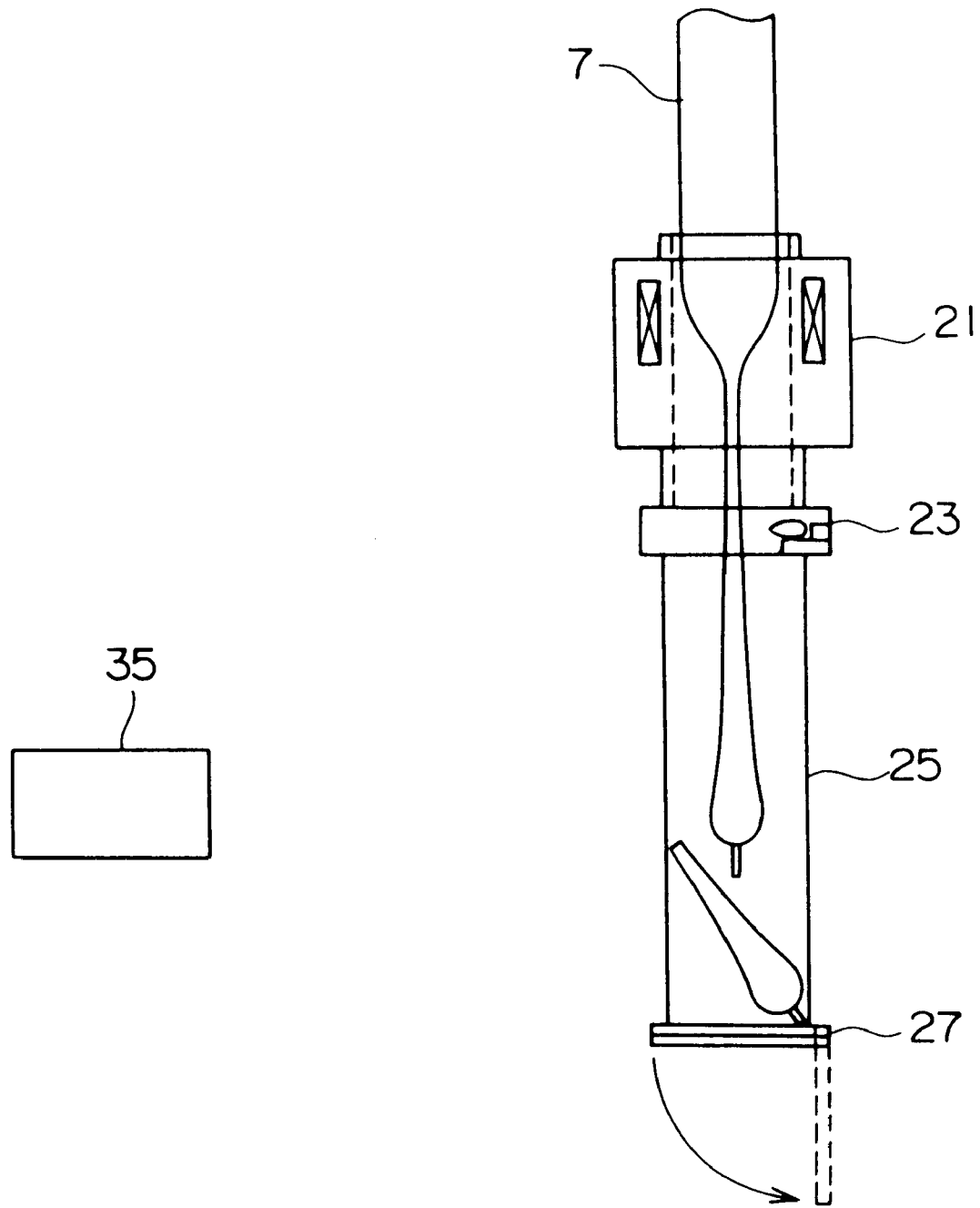
FIG. 5 is a longitudinal sectional view of a heating furnace of a first example of a second embodiment of a heating and processing apparatus of and end of an optical fiber preform of the present invention.

FIG. 5 is a partial view of the end heating and processing apparatus of the optical fiber preform according to a first example of the second embodiment of the present invention.

An end heating and processing apparatus 20 of the optical fiber preform illustrated in FIG. 5 comprises a heat processing furnace 21, a cutter 23, a cut portion removal chamber 25, a shutter 27, and not illustrated gas nozzles. Further, the end heating and processing apparatus 20 has a controlling means 35.

In the end heating and processing apparatus 20 illustrated in FIG. 5, compared with the heating furnace 1 illustrated in FIG. 1, the heat processing furnace 21 of FIG. 5 corresponds to the lower heating furnace 3 of FIG. 1 and corresponds to the first heating means of the present invention. The lower chamber 9 of FIG. 1 corresponds to the cut portion removal chamber 25 of FIG. 5 and corresponds to the unnecessary portion holder of the present invention. The shutter 10 of FIG. 1 corresponds to the shutter 25 of FIG. 5 and corresponds to the unnecessary portion discharging means of the present invention. The gas nozzles 8 of FIG. 1 correspond to the gas nozzles not illustrated in FIG. 5 and correspond to the coolant discharging means of the present invention. The controlling means 35 of FIG. 5 corresponds to the controlling means 15 of FIG. 1.

The controlling means 35 illustrated in FIG. 5 basically controls the process illustrated in FIG. 2. Namely, the end heating and processing apparatus 20 illustrated in FIG. 5 also performs the various steps illustrated in FIG. 2, that is, S1: Step of Loading Optical Fiber Preform, S2: Step of Processing Lower Portion of Preform, S3: Step of Eliminating Unnecessary Portion, S4: Step of Cooling Processed Portion, and S6: Step of Repetition step. Of course, in the second embodiment as well, it is also possible to perform the step of heating the entire upper portion of the optical fiber preform of step 5 in parallel to these steps as needed. Further, in the second embodiment, it is also possible to perform the step of removing the optical fiber preform of step 7.

The end heating and processing apparatus 20 of FIG. 5 further includes the cutter 23. The end heating and processing apparatus of the optical fiber preform illustrated in FIG. 1 was structured so that the unnecessary portion dropped off due to its own weight and was held in the lower chamber 9, but the end heating and processing apparatus of the optical fiber preform illustrated in FIG. 5 is structured to cut away the unnecessary portion from the body of the optical fiber preform 7 by the cutter 23. When cutting the unnecessary portion, the cutter 23 cuts away the unnecessary portion from the body of the optical fiber preform 7 by imparting to the unnecessary portion a force of an extent not giving a large shock to the body of the optical fiber preform 7.

In the end heating and processing apparatus 20 illustrated in FIG. 5, the upper heating furnace 2 corresponding to the second heating means of the present invention, the furnace body 4, the support rod 7a, and the suspension mechanism 12 of the heating furnace 1 illustrated in FIG. 1 are not illustrated, but the end heating and processing apparatus 20 of FIG. 5 is also provided with a support rod corresponding to the support rod 7a and a suspension mechanism corresponding to the suspension mechanism 12. Further, in the end heating and processing apparatus of the optical fiber preform illustrated in FIG. 5, the second heating means of the present invention corresponding to the upper heating furnace 2 can also be provided above the heat processing furnace 21 according to need. Further, a cooling portion can be provided in the side wall of the cut portion removal chamber 25 in the same way as the lower chamber 9.

Accordingly, in the end heating and processing apparatus 20 illustrated in FIG. 5 as well, aside from the addition of the cutter 23 for the elimination of the unnecessary portion, the end shape of the optical fiber preform can be processed in the same way as in the first embodiment.

Note that, the second embodiment will be explained stressing how is the end shape of the optical fiber preform 7 is processed.

The inventors of the present application discovered the following advantages requiring improvement in the heating furnace 1 illustrated in FIG. 1 and the end heating and processing apparatus 20 illustrated in FIG. 5.

The first disadvantage was that, as illustrated in FIG. 4, if all of the unnecessary portion is discarded, at the time of acceleration in the initial stage of drawing the optical fiber, the optical fiber drawn during the period before the characteristics stabilize is wasted. Details thereof will be explained by referring to FIG. 6.

Figure 6:
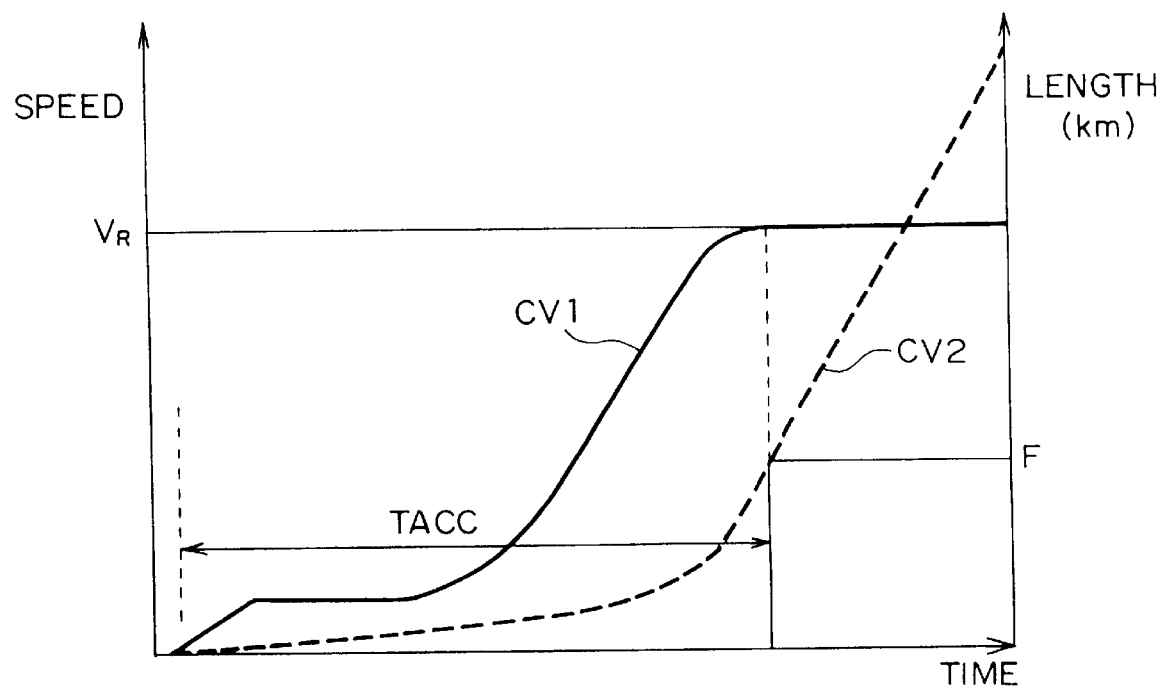
FIG. 6 is a graph illustrating a change of a line speed and a length of an optical fiber along with the elapse of time in a drawing step of an optical fiber.

FIG. 6 is a graph illustrating the change of the line speed and the length of the optical fiber along with the elapse of time in the process of drawing an optical fiber. The abscissa indicates the elapse of time, while the ordinate indicates the line speed and the length of the optical fiber. A curve CV1 indicates the line speed SPEED, and a curve CV2 indicates the length LENGTH (km) of the optical fiber. $V_R$ in the ordinate indicates a target line speed, and $T_{ACC}$ indicates an acceleration time.

Studies by the inventors of the present application found that the length of the optical fiber consumed at the time of acceleration of the drawing of the optical fiber (acceleration time $T_{ACC}$) became a constant value F. The optical fiber in this state is not suitable for actual use since it is unstable in diameter. Accordingly, if discarding the portion of the optical fiber preform wasted in the initial stage of drawing in this way as the unnecessary portion, the optical fiber preform is wasted. Accordingly, as explained in the first embodiment, it is not necessary to discard all of the optical fiber preform considered to be unnecessary.

The second disadvantages resides in that, since the heat processing furnace 21 and the cut portion removal chamber 25 are connected, when the unnecessary portion cut away from the optical fiber preform 7 by the cutter 23 is discharged to the outside by opening the shutter 27, the outside air enters the cut portion removal chamber 25. In that case, if the heat processing furnace 21 is constituted by a carbon resistance furnace and the carbon resistance furnace is heated, the carbon processing furnace will be damaged and carbon will deposit at the surface of the optical fiber preform 7. The disadvantage of the optical fiber easily breaking when such dust deposits to the optical fiber preform 7 was explained above. In order to prevent such damage of the carbon resistance furnace, it is possible to wait until the temperature of the carbon resistance furnace sufficiently falls, but this would result in a very long processing time.

Figure 7:
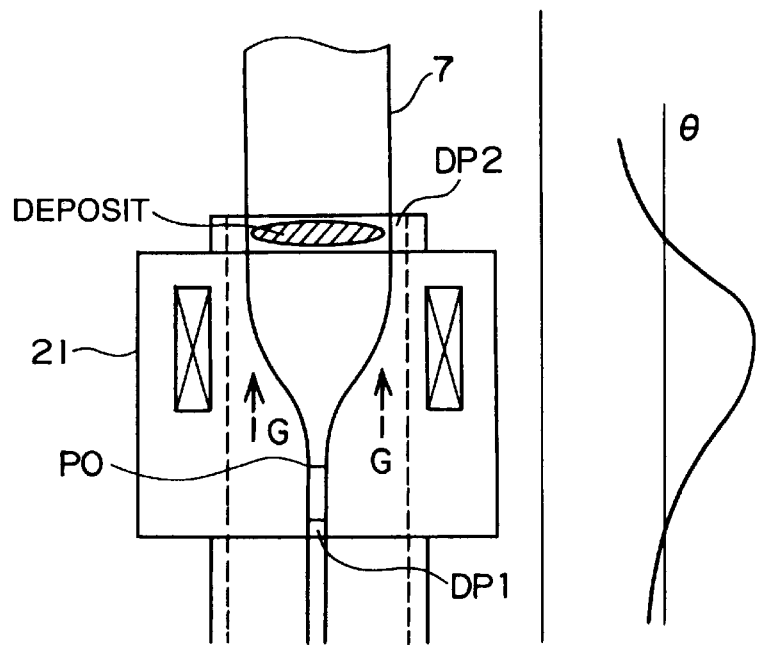
FIG. 7 is a partial enlarged view showing a flow of gas and a temperature distribution at the periphery of a heat processing furnace of the end heating and processing apparatus illustrated in FIG. 5.

The results of examination of the foreign matter adhering to the surface of the optical fiber preform will be explained by referring to FIG. 7. FIG. 7 is a partial enlarged view of the area around the heat processing furnace 21 of the end heating and processing apparatus 20 illustrated in FIG. 5. FIG. 7 shows also a gas flow G and a temperature distribution at the periphery of the heat processing furnace 21.

The foreign matter adhering to the surface of the optical fiber preform 7 consists of a vapor of $SiO_2$ generated when the optical fiber preform 7 is melted and fine carbon particles from the carbon resistance furnace or SiC generated by a reaction of the carbon and $SiO_2$. It was found that the regions where such foreign matter deposited to the surface of the optical fiber preform 7 were the portions above and below the heat processing furnace 21 where the temperature of the optical fiber preform 7 was less than a certain temperature θ, for example less than θ=1100° C. Namely, the regions where the foreign matter deposited were, as illustrated in FIG. 7, the lower end (lower deposition portion) DP1 of the heat processing furnace 21 and the portion above (upper deposition portion) DP2 the heat processing furnace 21. The foreign matter deposited to the lower end DP1 is not a disadvantage since that portion is discarded after processing the end shape, but it is necessary to devise countermeasures for the foreign matter deposited to the upper deposition portion DP2.

P0 in FIG. 7 indicates a drawing start position.

Figure 8:
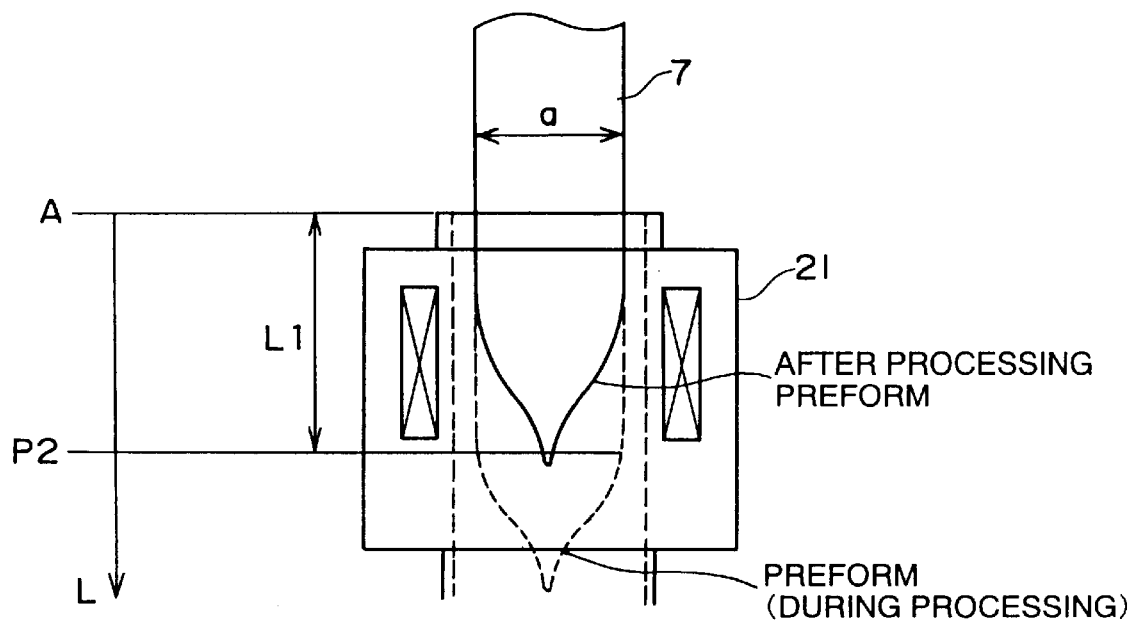
FIG. 8 is a view illustrating a positional relationship between the heat processing furnace of the end heating and processing apparatus illustrated in FIG. 5 and the end of an optical fiber preform.
Figure 9:
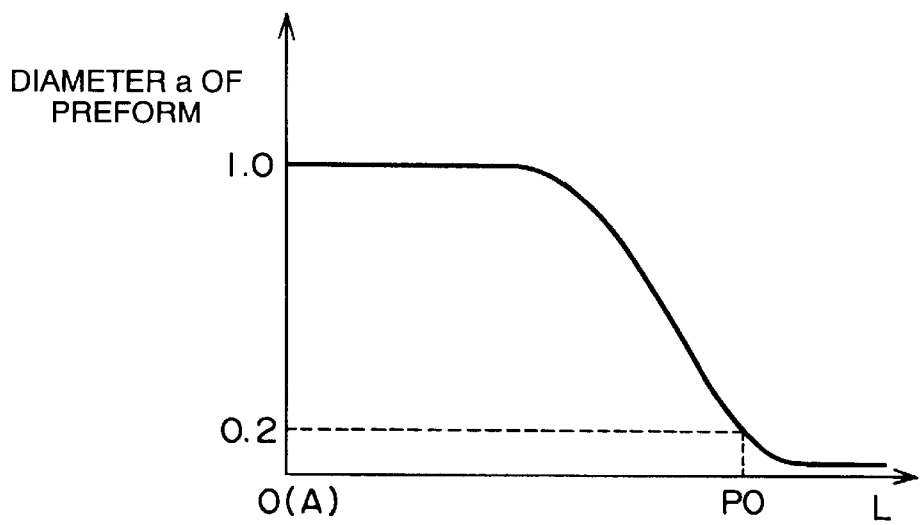
FIG. 9 is a graph of the relationship between a position of the optical fiber preform inserted in the heat processing furnace and a diameter of the optical fiber preform.

Results of examination of the correlation among the diameter a of the optical fiber preform 7, the heating position, and the end shape after the processing will be explained next with reference to FIG. 8 and FIG. 9. FIG. 8 is a partial enlarged view of the periphery of the heat processing furnace 21 of the end heating and processing apparatus 20 illustrated in FIG. 5 similar to FIG. 7. FIG. 8 is a view particularly illustrating the positional relationship of the heat processing furnace 21 and the end of the optical fiber preform 7. FIG. 9 is a graph showing the relationship between the position of the optical fiber preform 7 inserted in the heat processing furnace 21 and the diameter of the optical fiber preform 7.

In FIG. 8, the upper end of the heat processing furnace 21 is defined as a heating reference position A (position corresponding to the origin of a coordinate axis L), the start position of the effective portion of the optical fiber preform 7 before the heat processing is defined as P2, and the length between the heating reference position A and the start position P2 of the effective portion is defined as an insertion length L1.

In FIG. 8, the optical fiber preform 7 illustrated by the solid line shows the optical fiber preform 7 after the processing, while the optical fiber preform 7 illustrated by the broken line shows the optical fiber preform 7 during the processing.

In FIG. 9, the abscissa indicates the heating position L, while the ordinate indicates a value indexed to the diameter a of the optical fiber preform 7 normalized as 1. The A of the abscissa indicates the heating reference position, while the P0 indicates the drawing start position shown in FIG. 7.

As illustrated in FIG. 8 and FIG. 9, with respect to the end shape of the optical fiber preform 7 after the processing, the diameter a of the optical fiber preform 7 becomes constant with respect to the heating position, and the start position P2 of the effective portion of the optical fiber preform 7 is determined.

Figure 10A:
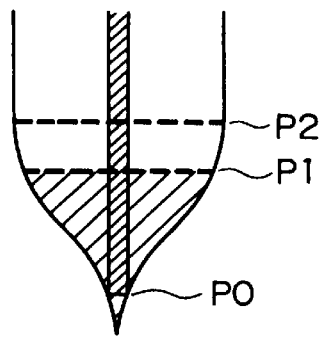
FIGS. 10A to 10C are views of relationships among a start position P2 of an effective portion, a position P1 after end of acceleration, and a drawing start position P0.
Figure 10B:
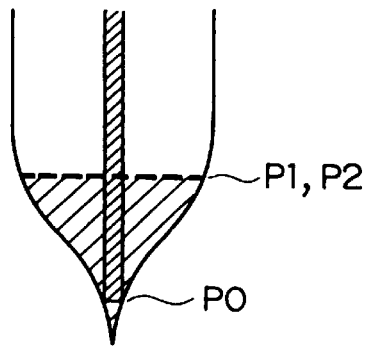
Figure 10C:
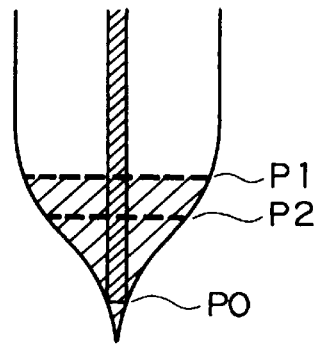

FIG. 10A to FIG. 10C are views of the relationship among the start position P1 of the effective portion, the position P1 after the end of acceleration, and the drawing start position P0. FIG. 10A shows a case where the position P1 after the end of acceleration is positioned under the start position P2 of the effective portion, FIG. 10B shows a case where the position P1 after the end of acceleration and the start position P2 of the effective portion coincide, and FIG. 10C shows a case where the position P1 after the end of acceleration is positioned above the start position P2 of the effective portion conversely to FIG. 10A. P0 indicates the drawing start position in FIG. 10A to FIG. 10C.

Figure 11:
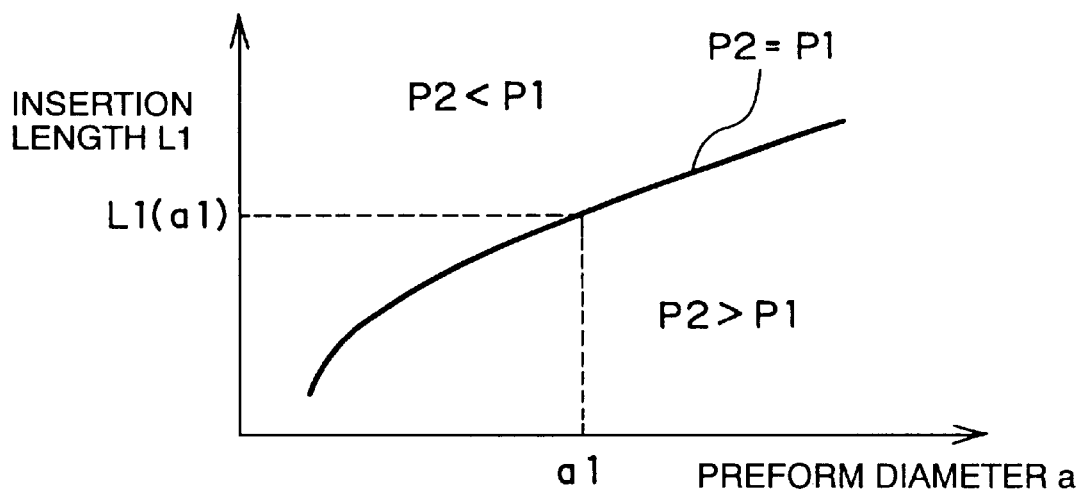
FIG. 11 is a graph of the relationship between a diameter (a) and an insertion length (L1) of the optical fiber preform.

FIG. 11 is a graph of the relationship between the diameter a of the optical fiber preform and the insertion length L1. The curve indicated by the solid line in FIG. 11 indicates the relationship between the diameter a of the optical fiber preform 7 and the insertion length L1 when the position P1 after the end of acceleration and the start position P2 of the effective portion coincide illustrated in FIG. 10B. The state located above (to the side of) this curve corresponds to FIG. 10A, and the state located under the curve corresponds to FIG. 10C.

The characteristic of FIG. 11 was found from a comparison of the volume of the optical fiber after the drawing and the volume of the optical fiber preform 7.

Figure 12:
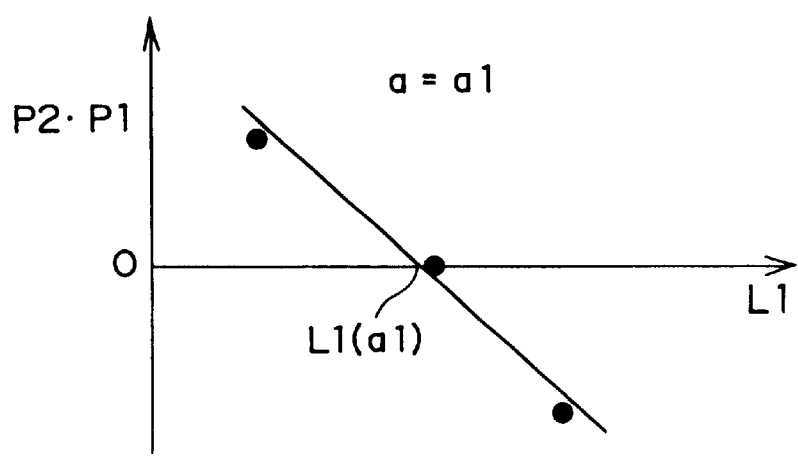
FIG. 12 is a graph of the relationship between the insertion length (L1) of the optical fiber preform, the position (P1) after the end of acceleration, and the effective portion start position (P2).

FIG. 12 is a graph of the relationships among the insertion length L1, the position P1 after the end of acceleration, and the start position P2 of the effective portion. The results shown in FIG. 12 were obtained by an examination of the relative positions of the position P1 after the end of acceleration and the start position P2 of the effective portion by changing the insertion length of the optical fiber preform 7 around the optimum insertion length L1 (a1) found from FIG. 11 for an optical fiber preform 7 having a diameter a1. A case where the start position P2 of the effective portion is above the position P1 after the end of acceleration is taken as plus (t). According to this experiment, it could be confirmed that the position P1 after the end of acceleration and the start position P2 of the effective portion coincide at the time of the insertion length L1 (a1) found from FIG. 11.

This will be summarized the followings. When considering the fact that the length F (km) of the optical fiber from the start of drawing to the end of acceleration becomes constant as explained by referring to FIG. 6 and the correlations explained by referring to FIG. 8 and FIG. 9, if the diameter a of the optical fiber preform 7 is known, by finding the insertion length L1 by referring to the characteristic of FIG. 11, the end heating and processing conditions of the optical fiber preform enabling drawing of a normal optical fiber immediately after the end of acceleration can be found.

The second example of the second embodiment reflects the above discovery.

Figure 13:
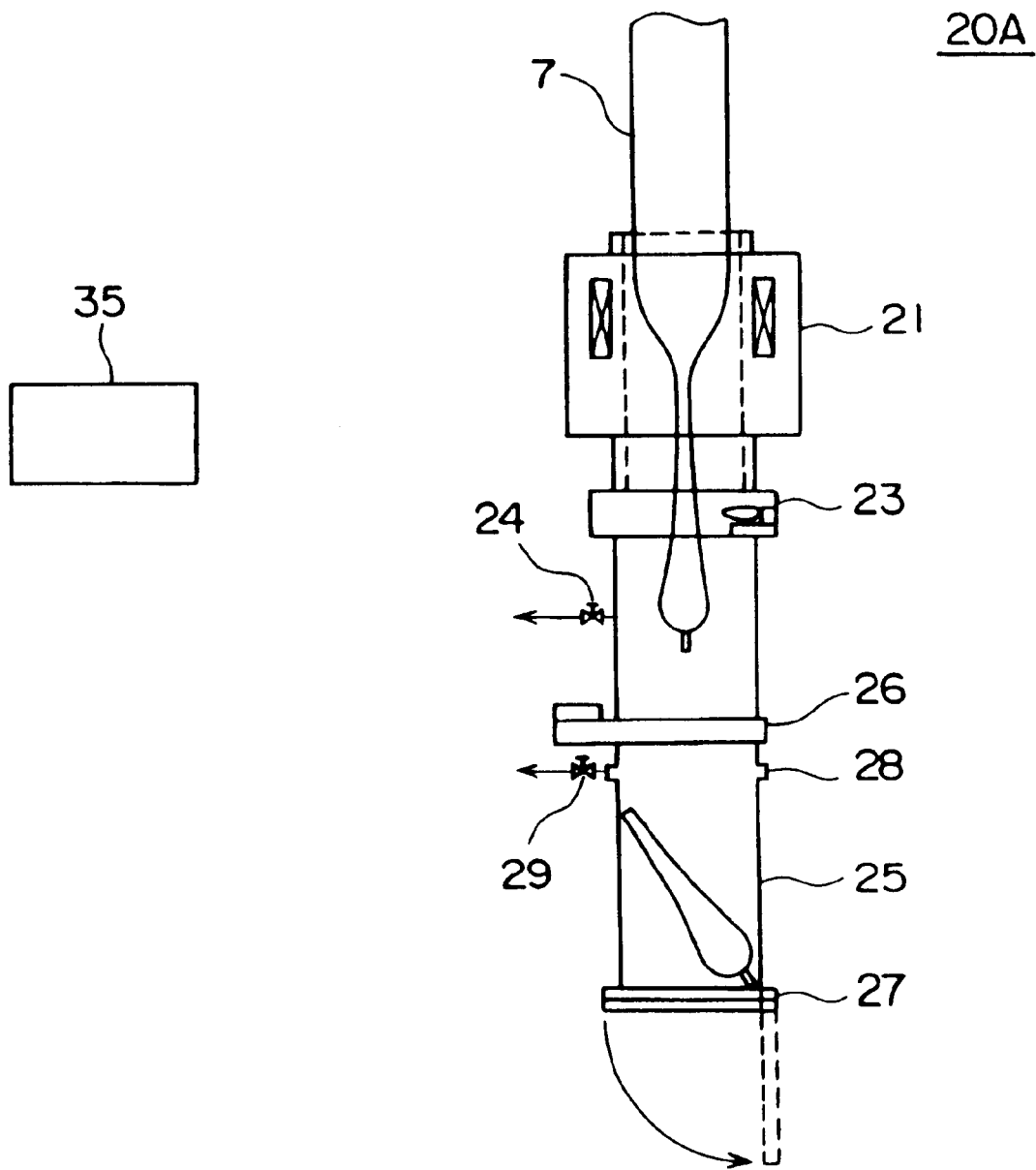
FIG. 13 is a longitudinal sectional view of a heating furnace of a second example of the second embodiment of a heating and processing apparatus of an end of an optical fiber preform of the present invention.

FIG. 13 is a view of the configuration of the end heating and processing apparatus 20A of an optical fiber preform of the second example of the second embodiment.

The end heating and processing apparatus 20A comprises a heat processing furnace 21, a cutter 23, a cut portion removal chamber 25, a shutter 27, not illustrated gas nozzles, an in-furnace gas discharge port 24, a vacuum gate valve 26, a purge gas feed port 28, and a purge gas discharge port 29. The end heating and processing apparatus 20A also has a controlling means 35.

The end heating and processing apparatus 20A is additionally provided, in addition to the heat processing furnace 21, cutter 23, cut portion removal chamber 25, shutter 27, and the not illustrated gas nozzles of the end heating and processing apparatus 20 illustrated in FIG. 5, the in-furnace gas discharge port 24, vacuum gate valve 26, purge gas feed port 28, and the purge gas discharge port 29.

Of course, the end heating and processing apparatus 20A of FIG. 6, in the same way as the end heating and processing apparatus 20 of FIG. 5, may also be provided with the upper heating furnace 2, furnace body 4, support rod 7a, suspension mechanism 12, etc. illustrated in FIG. 1.

In the end heating and processing apparatus 20A, the in-furnace gas discharge port 24, vacuum gate valve 26, purge gas feed port 28, and the purge gas discharge port 29 are provided for preventing the damage of the carbon resistance furnace due to the entry of air when the heat processing furnace 21 is a carbon resistance furnace.

The controlling means 35 of FIG. 13 controls the processing of the shape of the end of the optical fiber preform 7 to conditions preferred for drawing he optical fiber.

The method of processing the shape of the optical fiber preform preferred for drawing the optical fiber of the second example of the second embodiment while preventing damage of the carbon resistance furnace will be explained next.

The controlling means 35 illustrated in FIG. 13 basically performs the various steps illustrated in FIG. 2 in the same way as the controlling means 15 illustrated in FIG. 1.

However, in the second example of the second embodiment, as will be explained later, the processing in the step of processing the end of the optical fiber preform of step 2 is improved, the processing in the step of eliminating the unnecessary portion of step 3 is improved, and (a) the step of heating the preform to a low temperature and (b) the step of taking out the optical fiber preform 7 in the step of removal of the optical fiber preform of step 7 are improved for shortening the time.

Control of Sealing Gas

The control of the sealing gas in the step of processing the lower portion of the preform lower portion of step 2 for preventing deposition of foreign matter to the optical fiber preform 7 will be explained next.

Figure 14:
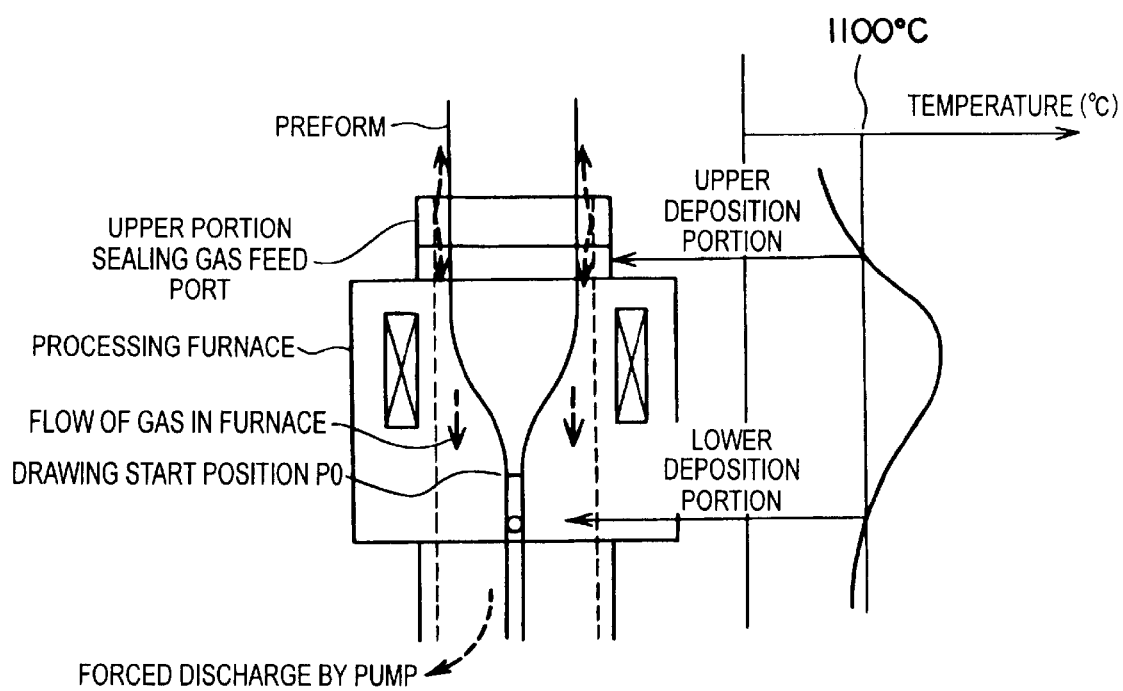
FIG. 14 is a partial enlarged view showing a flow of gas and a temperature distribution at the periphery of the heat processing furnace in the end heating and processing apparatus illustrated in FIG. 13 similar to FIG. 7 showing the flow of gas and the temperature distribution at the periphery of the heat processing furnace in the end heating and processing apparatus illustrated in FIG. 5.

FIG. 14 is a partial enlarged view showing the flow of gas and the temperature distribution at the periphery of the heat processing furnace in the end heating and processing apparatus 20 illustrated in FIG. 13 similar to FIG. 7 showing the flow of gas and the temperature distribution at the periphery of the heat processing furnace in the end heating and processing apparatus 20 illustrated in FIG. 5.

Figure 15:
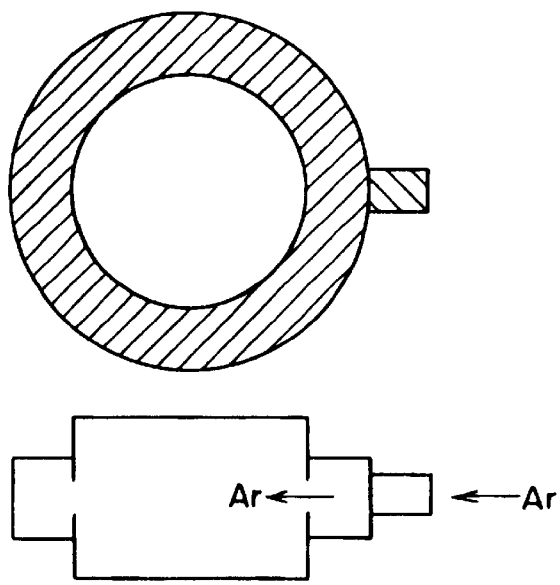
FIG. 15 is a view illustrating an upper portion sealing gas feed port in the vicinity of the heat processing furnace illustrated in FIG. 13 and FIG. 14.

FIG. 15 is a view of the upper portion sealing gas feed port in the vicinity of the heat processing furnace 21 illustrated in FIG. 13 and FIG. 14. This upper portion sealing gas feed port is comprised of a slit having a width of 2 mm arranged from the circumferential direction of the heat processing furnace 21.

When the optical fiber preform 7 is inserted into the furnace body and the end of the optical fiber preform 7 is heated and processed, an inert gas such as argon gas is blown as the upper portion sealing gas from the entire circumference of the upper opening of the heat processing furnace 21 in the diametrical direction of the optical fiber preform 7 using the upper portion sealing gas feed port illustrated in FIG. 15. Together with this, the upper portion sealing gas is forcibly discharged from the lower portion of the heat processing furnace 21 to make the sealing gas in the heat processing furnace 21 flow downward. Due to this, foreign matter will not rise to near the upper deposition portion DP2 explained by referring to FIG. 7, and the foreign matter generated in the heat processing furnace 21 will be discharged below the heat processing furnace 21.

The flow rate of the upper portion sealing gas and the exhaust flow rate of the lower portion of the heat processing furnace 21 change according to the flow rate and discharge flow rate of a clearance sealing gas between the optical fiber preform 7 and the upper inner diameter of the heat processing furnace 21.

The exhaust flow rate was made smaller than the flow rate where the concentration of $CO_2$ in the exhaust starts to rise. It could be confirmed that, as a result of the increase of the flow rate of the upper portion sealing gas while balancing the upper portion sealing gas flow rate and the exhaust flow rate, if the clearance between the optical fiber preform 7 and the inner diameter of the heat processing furnace 21 is 30 mm and the flow rate of the upper portion sealing gas is more than 60 SLM, no foreign matter is deposited on the surface of the optical fiber preform 7.

Figure 16:
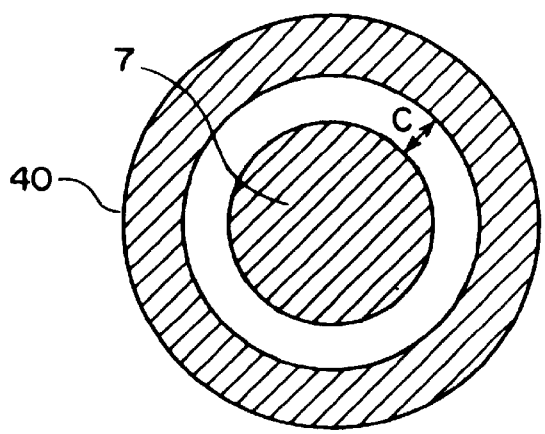
FIG. 16 is a view of a glass substrate fit in a clearance for finding the relationship between the clearance and an upper portion sealing gas flow rate.
Figure 17:
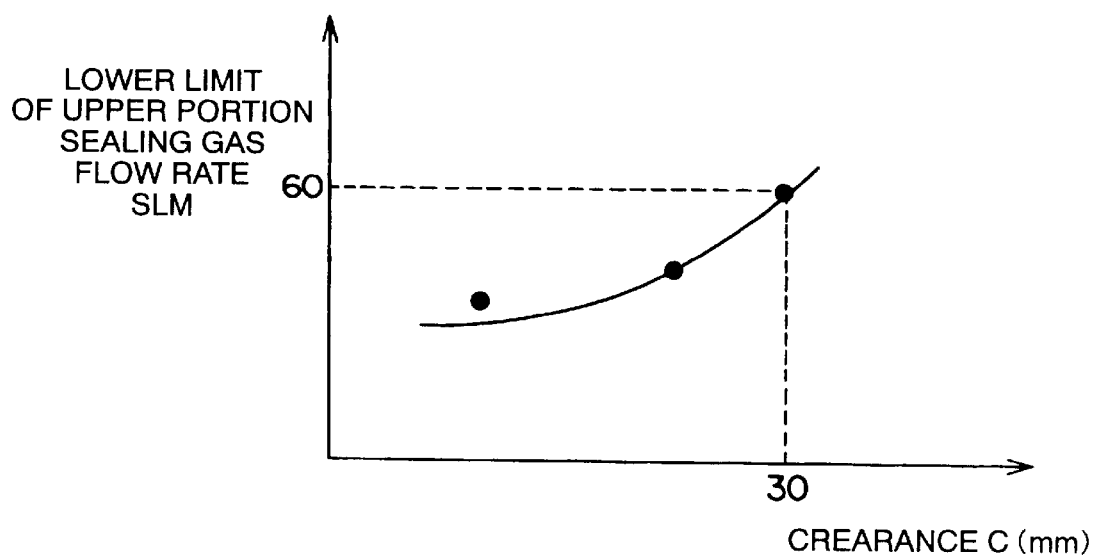
FIG. 17 is a graph of the relationship between a clearance C and the upper portion sealing gas flow rate.

Considering the relationship between the clearance C between the optical fiber preform 7 and the inner diameter of the heat processing furnace 21 and the upper portion sealing gas flow rate, as illustrated in FIG. 16, an annular (donut-shaped) glass plate 40 was placed above the heat processing furnace 21 to change the clearance C. The result thereof is shown in FIG. 17. When the clearance C is made narrower, the flow rate of the upper portion sealing gas can be reduced.

Note that, aside from when heating and processing the end of the optical fiber preform 7, that is, when the optical fiber preform 7 is not inserted in the furnace body (before the step of loading the optical fiber preform of step 1 in FIG. 2), the sealing effect is insufficient by only the upper portion sealing gas, so the air enters the heat processing furnace 21. Therefore, before the optical fiber preform 7 is introduced into the furnace body, sealing gas was fed from below the heat processing furnace 21 toward the upper portion in place of the upper portion sealing gas so as to create a rising flow in the interior of the furnace.

Elimination of Unnecessary Portion

As illustrated in FIG. 13, the vacuum gate valve 26 is provided between the cut portion removal chamber 25 and the heat processing furnace 21. When the unnecessary portion (unused portion) of the end of the optical fiber preform 7 is cut away from the optical fiber preform 7 by the cutter 23, as illustrated, it falls into the cut portion removal chamber 25.

When discharging the unnecessary portion outside of the cut portion removal chamber 25, the controlling means 35 closes the vacuum gate valve 26 to prevent the outside air from flowing into the heat processing furnace 21 when opening the shutter 27. Thereafter, the controlling means 35 opens the shutter 27 and discharges the unnecessary portion to the outside. After the unnecessary portion is discharged to the outside, the controlling means 35 closes the shutter 27 and introduces the inert gas from the purge gas feed port 28 to the cut portion removal chamber 25 and discharges the same from the purge gas discharge port 29 so as to sufficiently purge the interior of the cut portion removal chamber 25 by the inert gas.

After this gas purging, the controlling means 35 opens the vacuum gate valve 26 to enable the next unnecessary portion to fall into the cut portion removal chamber 25.

By shutting off the heat processing furnace 21 from the outside by the vacuum gate valve 26 and purging the cut portion removal chamber 25 by inert gas using the purge gas feed ports 28 and 29, the unnecessary portion of the optical fiber preform 7 can be discharged in the state with the heat processing furnace 21 elevated in temperature and thus the processing time can be shortened.

Cut Away Position of Unnecessary Portion

Figure 18:
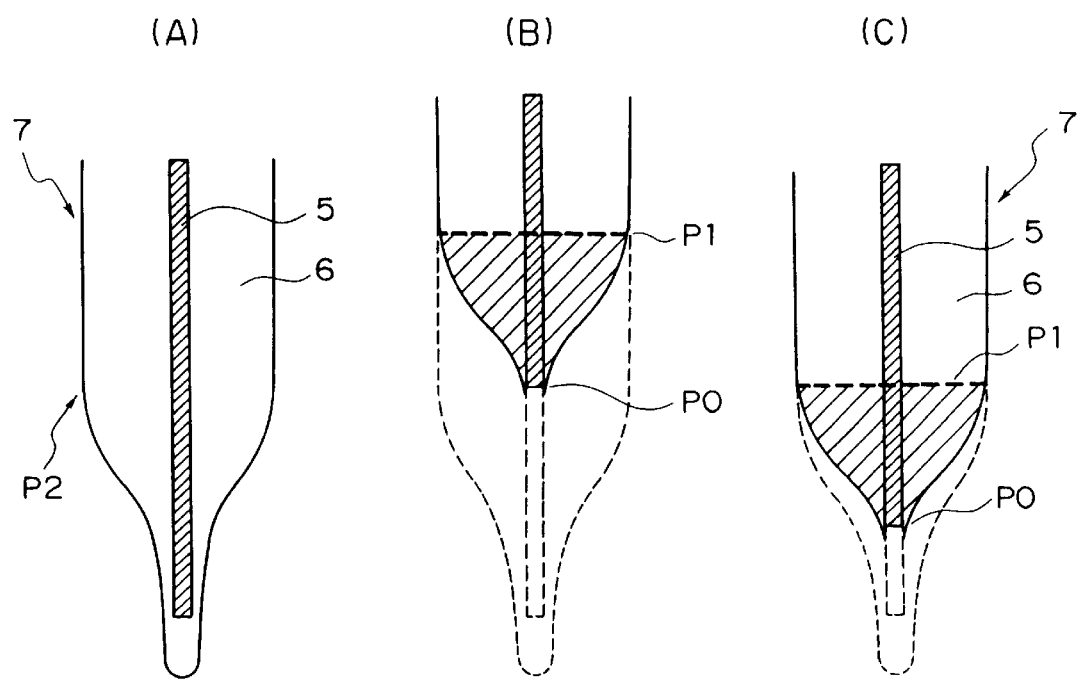
FIGS. 18A to 18C are views of cut away positions of an unnecessary portion of the end of an optical fiber preform.

FIGS. 18A to 18C are views illustrating cut away positions of the unnecessary portion of the end of the optical fiber preform 7.

FIG. 18A is a view of the end shape of the optical fiber preform 7 in the heated and processed state in the step of processing the lower portion of the preform illustrated in FIG. 2.

FIG. 18B is a view of the cut position of the unnecessary portion in the first embodiment of the present invention.

FIG. 18C is a view of the cut position of the unnecessary portion in the second embodiment of the present invention.

In FIG. 18A to FIG. 18C, the positional relationships among the drawing start position P0, the position P1 after the end of acceleration, and the start position P2 of the effective portion are shown.

The optical fiber preform 7 is constituted by the core portion 5 and the cladding portion 6.

When comparing the end shape of the optical fiber preform 7 according to the first embodiment shown in FIG. 18B and the end shape of the optical fiber preform 7 of the second example of the second embodiment shown in FIG. 18C, in FIG. 18C, considering the fact that a certain length of optical fiber having a quality not satisfying the standard is produced from the start of the drawing until the end of acceleration as explained by referring to FIG. 6, the end of the optical fiber preform 7 is cut away leaving a length corresponding to that portion.

This cut away position can be controlled according to the heating position of the optical fiber preform 7 in the heat processing furnace 21. Accordingly, the controlling means 35 controls the suspension mechanism 12 illustrated in FIG. 1 to suitably determine the end position of the optical fiber preform 7 with respect to the heat processing furnace 21 and cut away the end of the optical fiber preform 7 at the cut away position illustrated in FIG. 18C.

When using the optical fiber preform 7 cut in this way to draw the optical fiber, the unnecessary portion is drawn during the period from the start of the drawing to the end of acceleration as illustrated in FIG. 6. The optical fiber is drawn from the optical fiber preform 7 having the predetermined diameter when the target drawing speed is reached. As a result, the waste of the optical fiber preform 7 is eliminated.

The second example of the second embodiment was explained stressing the differences from the first embodiment. Accordingly, the first embodiment can be applied to portions for which explanations were omitted.

According to the second embodiment, the following features and effects are exhibited compared with the first embodiment.

(1) Waste of the optical fiber preform 7 is eliminated.

(2) Deposition of foreign matter becomes much smaller. As a result, a high quality optical fiber can be manufactured.

(3) There is no need to lower the temperature of the heat processing furnace 21 for the discharge of the unnecessary portion, so the end processing time of the optical fiber preform 7 is shortened.

INDUSTRIAL APPLICABILITY

An optical fiber preform processed according to the present invention is then drawn into an optical fiber. The thus formed optical fiber may be used for a variety of types of optical communications, optical measurement, etc.

What is claimed is:

1. An end heating and processing method of an optical fiber preform including a step of processing an optical fiber preform by heating and melting an end of a sintered optical fiber preform comprising a core portion and a cladding portion formed on an outer circumference thereof so as to process the end such that a shape is provided for drawing an optical fiber, processing step includes an optical fiber perform positioning step of positioning the end of said optical fiber preform in the vicinity of a heating portion for heating the end of said optical fiber preform, an end processing step of heating the end of said optical fiber preform to process the end to the shape of a melted and deformed portion at the time of said drawing, an unnecessary portion elimination step of eliminating an unnecessary portion of the end processed portion obtained by heating and melting said optical fiber preform processed to said predetermined shape, and an optical fiber preform end cooling step of blowing an inert gas to the end of the optical fiber preform remaining after the elimination of said unnecessary portion to cool the same.

2. An end heating and processing method of an optical fiber preform as set forth in claim 1, wherein, in said end processing step, the end of said optical fiber preform is processed so that a length of said optical fiber preform from a parallel portion to the end of said optical fiber preform becomes a length in which a shortest startup time of the drawing process of the optical fiber is obtained.

3. An end heating and processing method of an optical fiber preform as set forth in claim 1, further including, after said optical fiber preform processing step, a temperature lowering step for lowering the heating temperature of said optical fiber preform to a temperature whereby thermal strain does not occur in said optical fiber preform even in an air atmosphere.

4. An end heating and processing method of an optical fiber preform as set forth in claim 3, wherein, in said temperature lowering step, the optical fiber preform as a whole is heated to 1100 to 1300° C., then the heating temperature of said optical fiber preform is lowered to 600 to 400° C.

5. An end heating and processing method of an optical fiber preform as set forth in claim 1, wherein, in said end processing step, an inert gas sealing gas is made to flow from above to below at the periphery of the end heating portion of said optical fiber preform.

6. An end heating and processing method of an optical fiber preform as set forth in claim 1, wherein, before the introduction of the optical fiber preform into a heating region before said end processing step, an inert sealing gas is made to flow from above to below to the end heating portion of said optical fiber preform.

7. An end heating and processing method of an optical fiber preform as set forth in claim 1, wherein, in the unnecessary portion elimination step in said optical fiber preform processing step, a heating region is shut off from the outside air, and said unnecessary portion is discharged from said heating region to the outside in a state maintaining the heated state.

8. An end heating and processing method of an optical fiber preform as set forth in claim 1, wherein, in the unnecessary portion elimination step in said optical fiber preform processing step, the unnecessary portion is eliminated while leaving an amount corresponding to the optical fiber preform drawn from the start of the drawing of the optical fiber to when a target drawing speed is reached.

* * * * *